United States Patent [19]

Yamada

[11] 4,016,571

[45] Apr. 5, 1977

[54] INK JET RECORDING APPARATUS

[75] Inventor: Takahiro Yamada, Hitachi, Japan

[73] Assignee: Hitachi, Ltd., Japan

[22] Filed: Sept. 12, 1975

[21] Appl. No.: 612,960

[30] Foreign Application Priority Data

Sept. 17, 1974 Japan ........................... 49-106080

[52] U.S. Cl. ........................................... 346/75

[51] Int. Cl.² ..................................... G01D 18/00

[58] Field of Search ................................... 346/75

[56] References Cited

UNITED STATES PATENTS

| | | | |
|---|---|---|---|
| 3,750,191 | 7/1973 | Naylor | 346/75 |
| 3,761,941 | 9/1973 | Robertson | 346/75 X |
| 3,769,632 | 10/1973 | Julisburger | 346/75 |
| 3,866,237 | 11/1975 | Meier | 346/75 |

*Primary Examiner*—Joseph W. Hartary
*Attorney, Agent, or Firm*—Craig & Antonelli

[57] ABSTRACT

By ejecting pressurized ink from a nozzle, ink droplets are produced and shoot toward a recording paper to be deposited thereon. In order to produce a recording pattern by correspondingly deflecting the ink droplets, the latter is charged in dependence upon the recording information signal. The ink droplets thus charged are then subjected to a coulomb force upon passage through a deflection electric field. For the purpose of charging the ink droplets properly by means of synchronizing the information signal precisely with the timing phase of the ink droplets production, the magnitude of voltage supplied to an electro-strain element for vibrating the nozzle is controlled.

8 Claims, 11 Drawing Figures

INK JET RECORDING APPARATUS

BACKGROUND OF THE INVENTION

1. Field of the Invention

The present invention relates in general to an ink jet recording apparatus, and in particular to an ink jet recording apparatus of the type in which an ink jet nozzle is mechanically vibrated in order to produce the ink droplets without fail.

2. Description of the Prior Art

According to a fundamental arrangement of the ink jet recording apparatus, pressurized ink is ejected from a nozzle. When the ink mass is broken up into ink droplets, a quantity of the electric charge conforming to the recording information is imparted to the ink droplets through an electrostatic coupling. The charged ink droplets are then passed through an electric field of a constant intensity and deflected under the influence of the prevailing electrostatic force. In view of the fact that the ink takes a stream like form immediately after the ejection from the nozzle orifice, the charging of the ink droplets is carried out by means of a charging electrode disposed so as to enclose the ink stream, wherein the electrostatic capacity formed between the ink stream and the charging electrode is charged by the voltage of the recording information signal. In other words, the ink stream in the charged state is broken up into the ink droplets, whereby the electric charge is, so to say, confined within the individual ink droplets. In order to confine the electric charge within the ink droplets at a proper and correct quantity, it is desirable that the electrostatic capacity existing between the ink stream and the charging electrode has been completely charged and is in the stable state the ink stream is broken up into the ink droplets. If the ink droplets are produced before the completion of the charging of the electrostatic capacity, it will become difficult to maintain the ratio between the magnitude of the information signal i.e. (voltage applied to the charging electrode) and the quantity of the electric charge confined in and carried by the ink droplets at a constant value. Such difficulty should of course be overcome to accomplish the correct deflection of the ink droplets.

SUMMARY OF THE INVENTION

An object of the present invention is therefore to provide an ink jet recording apparatus which is provided with means for constantly maintaining the phase or timing relationship between the production of the ink droplets and the application of the information signal in a predetermined range.

Another object of the invention is to provide means which can prevent the deviation of the timing phase of the ink droplets production from the phase of the information signal independently of any variations in environmental conditions.

Still another object of the invention is to provide an ink jet recording apparatus in which the production phase of the satellite ink droplets is synchronized with the phase of the information signal.

According to the invention, the ink droplets are electrically charged with voltage of a test (or check) information signal. By detecting the quantity of the charge carried by the charged ink droplet, the relationship between the phase of the test information signal and the production timing of the ink droplets is determined. On the basis of the obtained results, the strength of the vibratory excitation applied to the nozzle is controlled.

DETAILED DESCRIPTION OF THE PREFERRED EMBODIMENT

Figure 1:
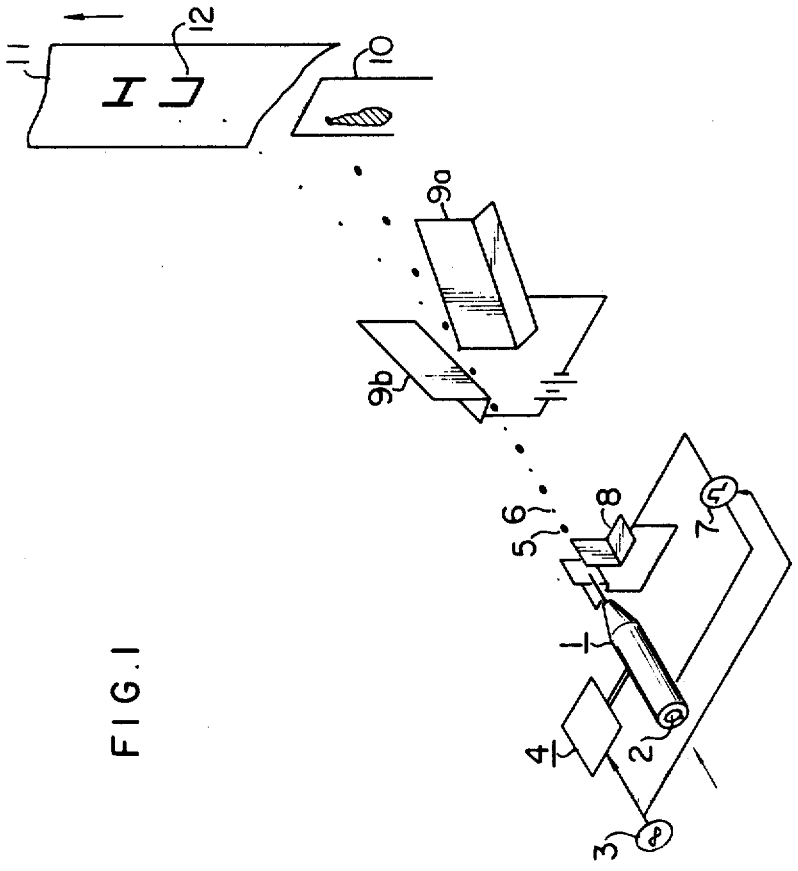
FIG. 1 shows generally an embodiment of an ink jet recording apparatus in which satellite ink droplets are used.

Referring to FIG. 1 which shows generally an ink jet recording apparatus employing satellite ink droplets, reference numeral 1 indicates a nozzle which is supplied with ink 2 under a predetermined pressure to be ejected from the orifice of the nozzle 1. Mounted on the nozzle 1 at the body portion thereof is an electromechanical converter 4 for vibrationally exciting the nozzle 1, which converter 4 in turn is connected to a voltage source 3 of high frequency and variable voltage. With such arrangement of the ink ejecting mechanism as described above, it is possible to alternately produce ink droplets 5 and 6 of different droplets sizes when conditions, such as the ink supply pressure, magnitude of excitation applied to ink as ejected from the nozzle orifice or the magnitude of the vibratory excitation applied to the nozzle, the frequency of the excitation, the aperture of the nozzle, and the physical properties of the ink, are set at appropriate values or conditions. It is also possible to make the production period of the paired ink droplets 5 and 6 of different sizes in synchronism with the output frequency of the high frequency voltage source 3. The ink droplets 6 of small droplets size is also referred to as a satellite ink droplets. A recording information signal produced from a source 7 of recording pattern signals is applied to charging electrodes 8 to impart to the satellite ink droplets 6 a predetermined quantity of electrical charge. The ink droplets 5 and 6 run through the space between the charging electrodes 8 and hence between deflecting electrodes 9*a* and 9*b* where the satellite ink droplets 6 is subjected to an electro-static deflection force in dependence upon the electric charge confined in the ink droplets 6. It is preferred to use only the satellite ink droplets 6 for an accurate or fine recording pattern. On the other hand, for the production of a relatively rough recording pattern, a higher efficiency may be attained rather by using the ink droplets 5 of a larger droplet size. Reference numeral 10 denotes a catcher for collecting the ink droplets which run straight without being deflected. The ink droplets which have been deflected and, therefore, not collected by the catcher 10 are then deposited as dots on a recording medium such as paper 11 moving in the direction indicated by arrow, whereby recording patterns such as indicated by numeral 12 are produced on the recording medium 11. The ink droplets collected by the catcher 10 are recovered for repeated use, if necessary.

Figure 2:
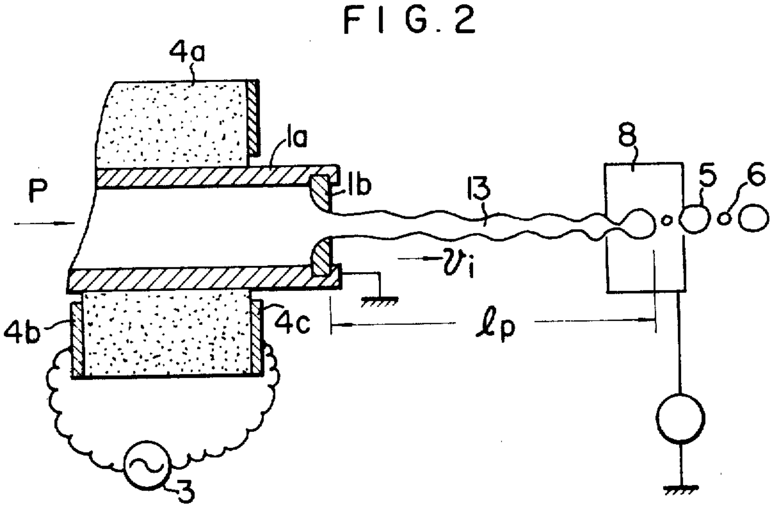
FIG. 2 is a longitudinal section view of a nozzle assembly.

Now, description will be made with reference to FIGS. 2 and 3 concerning the control of charging of the satellite ink droplets used in the ink jet recording apparatus described above. FIG. 2 shows an arrangement of the nozzle 1 and the electromechanical converter 4 for vibrating the former. As can be seen from the drawing, the nozzle 1 is composed of a metallic tube 1*a* fitted with an orifice member 1*b* at the projecting end. The electromechanical converter 4 comprises an electro-strain element 4*a* of a piezo-electric type which is disposed around the metallic tube 1*a* and provided with electrodes 4*b* and 4*c* at both sides thereof by bonding or the like means.

Figure 3:
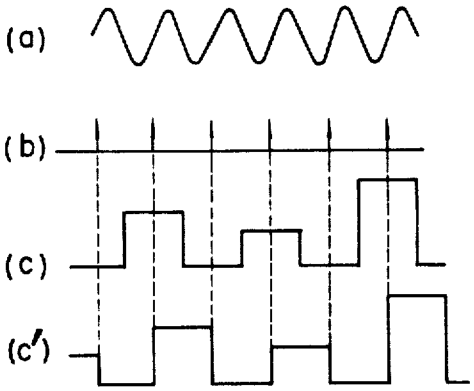
FIG. 3 is a diagram for showing phase relations between voltage applied to an electro-strain element, information signal applied to charging electrodes and production timing of satellite ink droplets.

With the construction of the vibratory nozzle assembly as described above, the electro-strain element 4*a* is supplied with voltage of a waveform such as shown in FIG. 3, line (*a*) at the electrodes 4*b* and 4*c* for vibrating the element 4*a*. Then, the timing phase of the production of the satellite ink droplets 6 which are separated or broken up from the leading end of the ejected ink flow stream 13 may be represented as illustrated in FIG. 3, line (*b*). In this connection, it is to be noted that the waveform of the information signal applied to the charging electrodes 8 relative to the timing phase of production of the satellite ink droplets 6 must be of the waveform such as indicated by line (*c*) in FIG. 3, so that the electrostatic capacity produced between the electrodes 8 and the ink flow stream 13 may be completely charged. In other words, the coincidence between the production of the satellite ink droplets and vibrations in the information signal, such as illustrated by the waveform in line (*c'*in FIG. 3 has to be avoided.

Figures 4A, 4B, 4C, 4D:
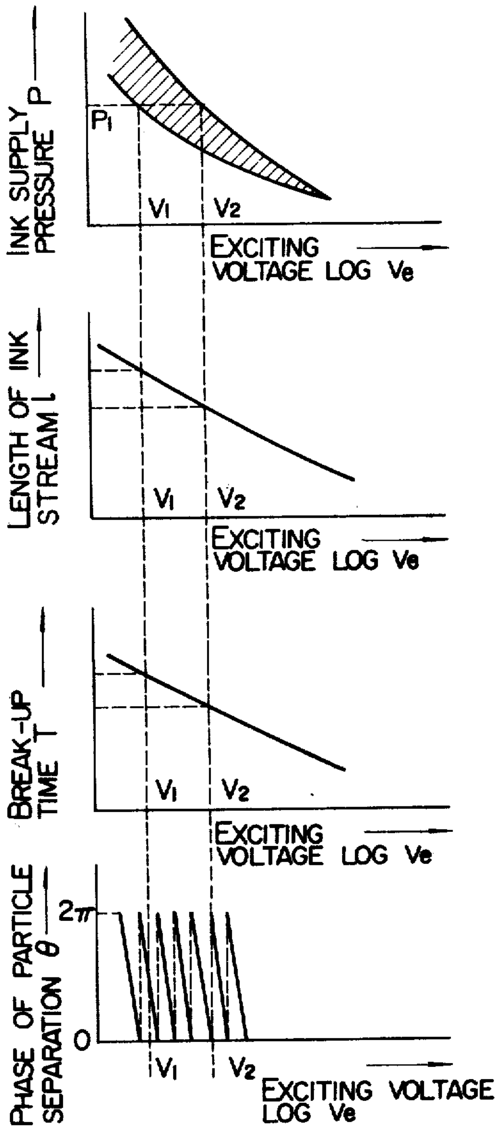
FIGS. 4A to 4D show graphically the characteristics of the satellite ink droplets production.

In producing the ink droplets 5 and 6 of different droplet sizes by means of the nozzle assembly described above, there have been observed characteristics, such as shown in FIGS. 4A to 4D. More particularly, FIG. 4A illustrates a relation between the ink supply pressure *p* and the exciting voltage V*e* under the conditions that the aperture of the nozzle is of $60\mu$ and the frequency of the excitation voltage applied to the electrodes 4*b* and 4*c* is selected at 60 KHz. In the experiment carried out by the inventor, it has been verified that the satellite ink droplets 6 can be produced without fail, when the exciting voltage V*e* lies in the range of 20 $V_{pp}$ to 25 $V_{pp}$ with the ink supply pressure $P_1$ fixed at 3 $kg/cm^2$.

On the other hand, when the exciting voltage $V_e$ is increased, the magnitude of the vibratory excitation of the ejected ink flow stream 13 is correspondingly increased, resulting in an increased initial vibration. As a consequence, periodical constrictions are rapidly produced in the ink flow stream 13, as a result of which the time interval $\tau$ (break-up time) elapsed before the ink droplets are separated from the ink flow stream is shortened. Further, the length *l* of the ink stream 13 is decreased. In this connection, the relation between $\tau$ and *l* can be expressed by the following formula;

$$\tau = l/Vi$$

where V*i* represents the ejection velocity of ink. The parameters *l* and $\tau$ take, respectively, substantially linear relations to the logarithm of the exciting voltage, i.e., log V*e*, as is shown in FIGS. 4B and 4C.

The period of the satellite ink droplets 6 being produced as separated or broken up from the ink flow stream 13 is coincident with the output frequency from the high frequency voltage source 3. The timing phase $\theta$ of the production of the ink droplets can be given by the following equation;

$$\theta = (\tau/T - n) + \theta'$$

where *T* is a period of the output voltage of the high frequency voltage source 3, *n* is a natural number defined by 0 $(\tau/T - n) < 1$ and $\theta'$ is a phase difference between the exciting voltage and the initially constricted part periodically produced in the ink stream.

Thus, the timing phase $\theta$ of the ink droplet production is varied as a function of the exciting voltage as is shown in FIG. 4D. By adjusting the magnitude of the exciting voltage V*e*, it is possible to adjust the timing phase $\theta$ for producing the ink droplet in the range of 0 to $2\pi$. The magnitude of variation in the exciting voltage V*e* required for varying the timing phase of the ink droplet production from 0 to $2\pi$ lies in a narrower range than that of the voltage for assuring the production of the satellite ink droplet 6. In an experiment carried out by the inventor, it has been observed that the allowable range of variations of the exciting voltage for producing reliably the satellite ink droplet extends from 20 $V_{pp}$ to 25 $V_{pp}$, while the variation of the exciting voltage V*e* required for varying the timing phase $\theta$ of the ink droplet production may satisfactorily be in the order of 0.7 $V_{pp}$.

Figure 5:
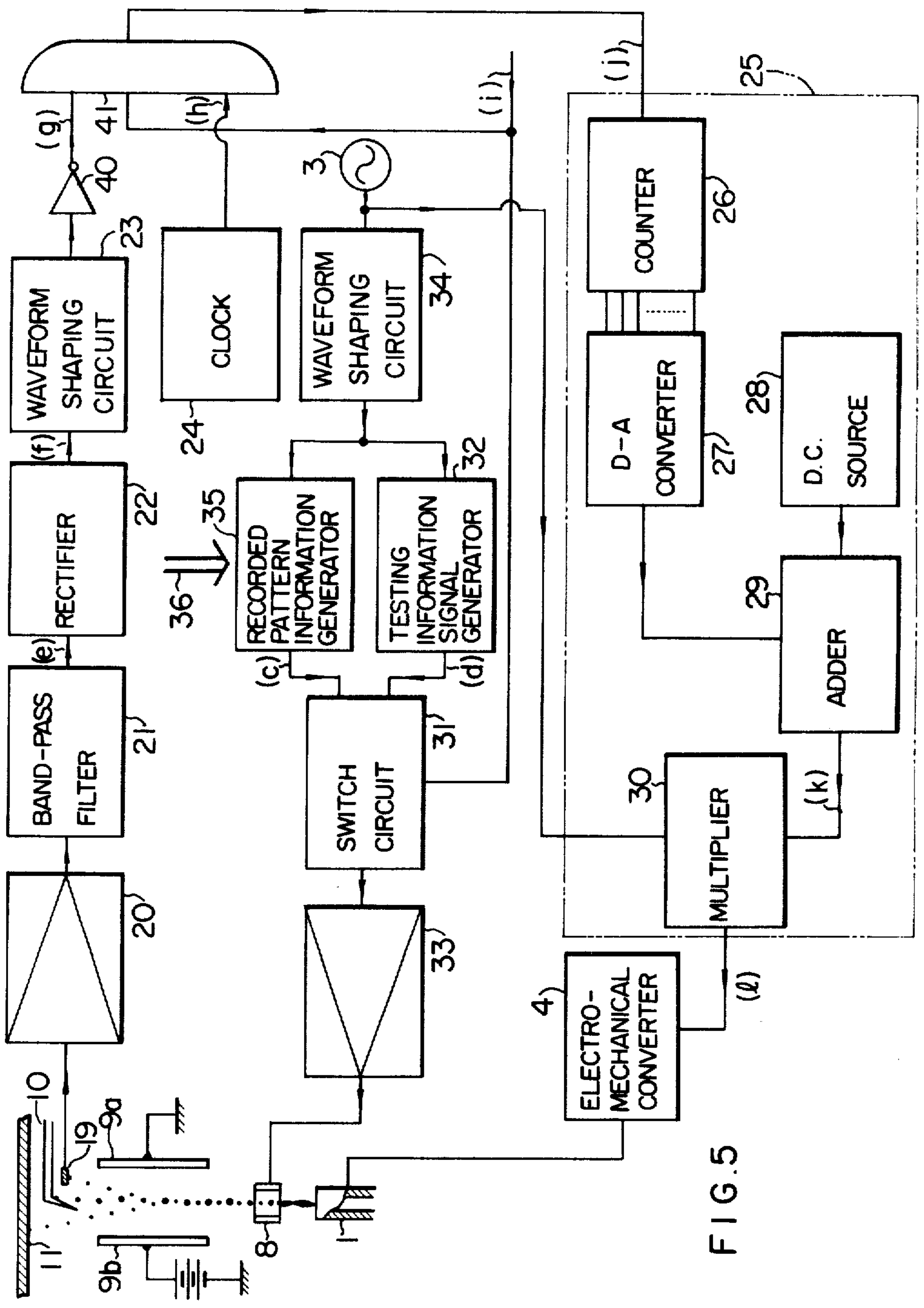
FIG. 5 is a block diagram of a control circuit for the phase matching according to the invention.

Next, reference is made to FIG. 5 which shows an automatic matching apparatus for automatically matching the timing phase of the ink droplet production and the phase of the information signal to be recorded. In this apparatus, the nozzle 1, the pressurized ink 2, the high frequency voltage source 3, the electromechanical converter 4, the charging electrodes 8, the deflecting electrodes 9*a* and 9*b*, the catcher 10, and the recording medium 11 are the same as those elements described hereinbefore with reference to FIGS. 1 and 2. Reference numeral 19 indicates a detector which is located in front of the catcher 10 and composed of a piezo-electric crystal microphone in the illustrated embodiment. The detector 19 is disposed at such a position that the running ink droplets properly charged with a test information signal will impinge onto the detector 19, which serves to convert the mechanical energy of the impinging droplets into electrical energy. Numeral 20 denotes an amplifier and numeral 21 denotes a band-pass filter. The filter 21 functions to pass the output of the detector 19 over the frequency band thereof only when the running ink droplets are properly charged by the test information signal (that is, when the timing phase of the ink droplets production is in a normal phase relation with the phase of the information signal). Numeral 22 denotes a rectifier circuit comprising rectifier diodes and smoothing capacitors. Numeral 23 designates a waveform shaping circuit which is composed of a Schmitt circuit and serves to determine whether the output from the rectifier circuit 22 is based on the normal charge carried by the ink droplet. When the phase relation is such that the ink droplets may be properly or normally charged, the waveform shaping circuit 23 produces the digital output logic "1". The output of the waveform shaping circuit 23 is connected to an inverter 40 for inverting the output from the waveform shaping circuit 23, which inverter 40 in turn is connected to one input of an AND gate 41 having additionally two other inputs, one for an output signal *h* from a clock generator 24 for timing the shift of the excitation level and the other for a check command signal *i*. For the clock generator 24 for shifting the excitation level, a conventional oscillator having a rectangular signal output may be employed, the oscillation output period which is selected slightly longer than the time required for responding to the phase matching operation through a closed loop. The check command signal *i* is so selected that the digital signal "1" is produced during the rest interval time such as the time required for the recording head to be returned after the scanning, etc. Reference numeral 25 indicates a circuit for shifting the excitation voltage level which serves to control the voltage applied to the the electro-mechanical converter 4 on the basis of the result of the check or test as hereinafter described. To this end, the circuit 25 comprises a binary counter 26 having an input connected to the output of the AND gate 41 and a digital-to-analog converter 27 for converting the digital output of the counter 26 into a corresponding analog quantity. The circuit 25 further comprises an adder 29 composed of an operational amplifier for serving to add together the output voltage from the digital-to-analog (or D-A) converter 27 and the voltage of the d.c. source 28, thereby to produce a signal *k*. The circuit 25 comprises additionally a multiplier circuit 30 which is commercially available in the name of a linear IC and operates to produce the excitation voltage *l* in response to both the outputs from the high frequency voltage source 3 and the adder circuit 29. Numeral 34 indicates a waveform shaping circuit employing a Schmitt circuit which operates to shape the output waveform of the output voltage from the high frequency voltage source 3, thereby to output a synchronizing signal applied to a circuit 35 for producing the recording pattern information signal and a circuit 32 for generating the test information signal. The recording pattern information signal generator 35 is arranged in a manner known in the conventional ink jet recording apparatus and serves to generate the voltage *c* to charge the ink droplets in the timing phase synchronized with the output from the waveform shaping circuit 34 on the basis of the recording information 36. The test information signal generator 32 is composed of two bistable multivibrators and serves to produce pulses *d* of a narrow width and inverted polarity in synchronism with the center portion of the recording pattern information signal. Numeral 31 indicates a switching circuit composed of analog switches and operates to change-over the test command signal *i* in dependence upon the outputs from the information generators 32 and 35. The output from the switching circuit 31 is coupled to the input of an amplifier 33 which can receive the input signals of both polarities and produce the output supplied to the charging electrodes 8.

Figure 6:
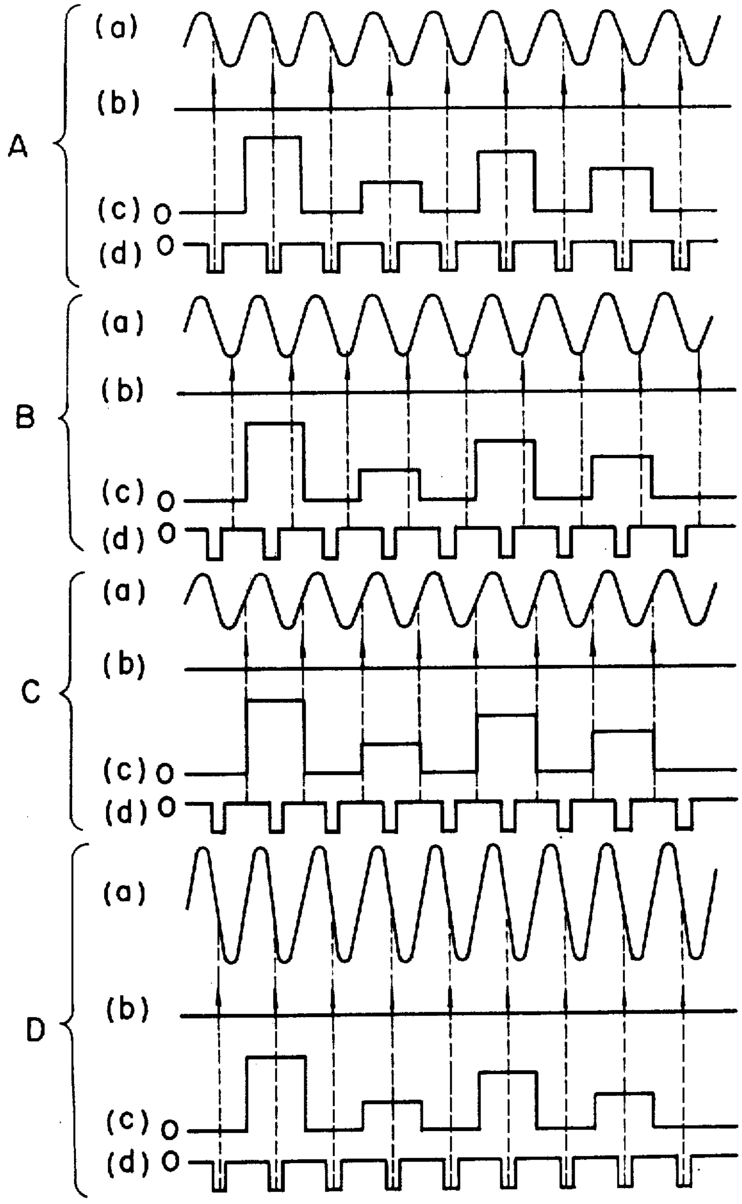
FIG. 6 graphically illustrates the principle of the phase matching operation according to the invention.

Now, referring to FIG. 6, the principle of the phase matching will be described. In the drawing, lines (*a*), (*b*), (*c*) and (*d*) of each of the sets of lines A, B, C, and D represent, respectively, the waveform of the excitation voltage, the timing phase of the satellite ink droplets being produced, the recording pattern information signal voltage and the test information signal voltage. In the case of the set A, the timing phase of the satellite ink droplets production, the recording pattern information signal and the test information signal are in a proper phase relation to one another. In the case of the set B, the timing phase of the satellite ink droplet is deviated from the center of the recording pattern information signal. The deviation of such a degree will exert substantially no adverse influence upon the recording. However, such deviation may possibly lead to the out-of-phase relation represented by the set C which will hinder the normal charging of the ink droplets. In this connection, when the test information signal is selected to be of such a short pulse width that the satellite ink droplet production timing is completely out of phase with the test information signal in the set B, it is possible to predict the out-of-phase of the stage B and introduce a correcting operation, which may be effected by increasing the excitation voltage applied to the nozzle, as is represented by the set D.

The above principle of the phase matching can be realized in the embodiment shown in FIG. 5, the phase matching operation of which will next be described with reference to FIGS. 7 and 8. In these figures, the reference symbols affixed to the signal waves correspond to those shown in FIG. 5. The region $\alpha$ represents the testing interval, while the region $\beta$ represents the range for the recording.

Figure 7:
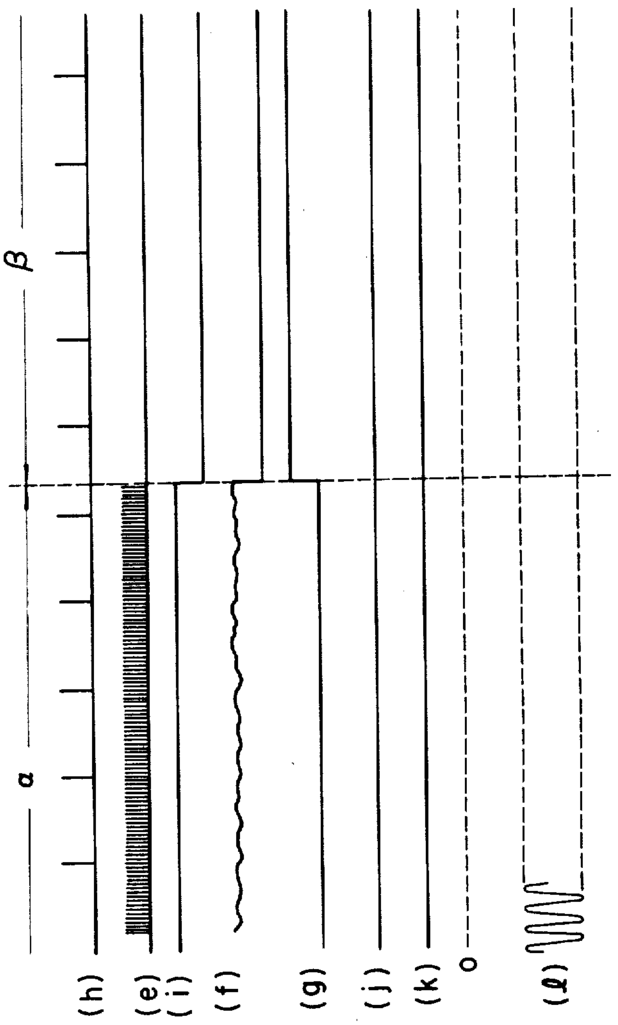
FIGS. 7 and 8 are time chart diagrams to illustrate the operation of the control circuit shown in FIG. 5.
Figure 8:
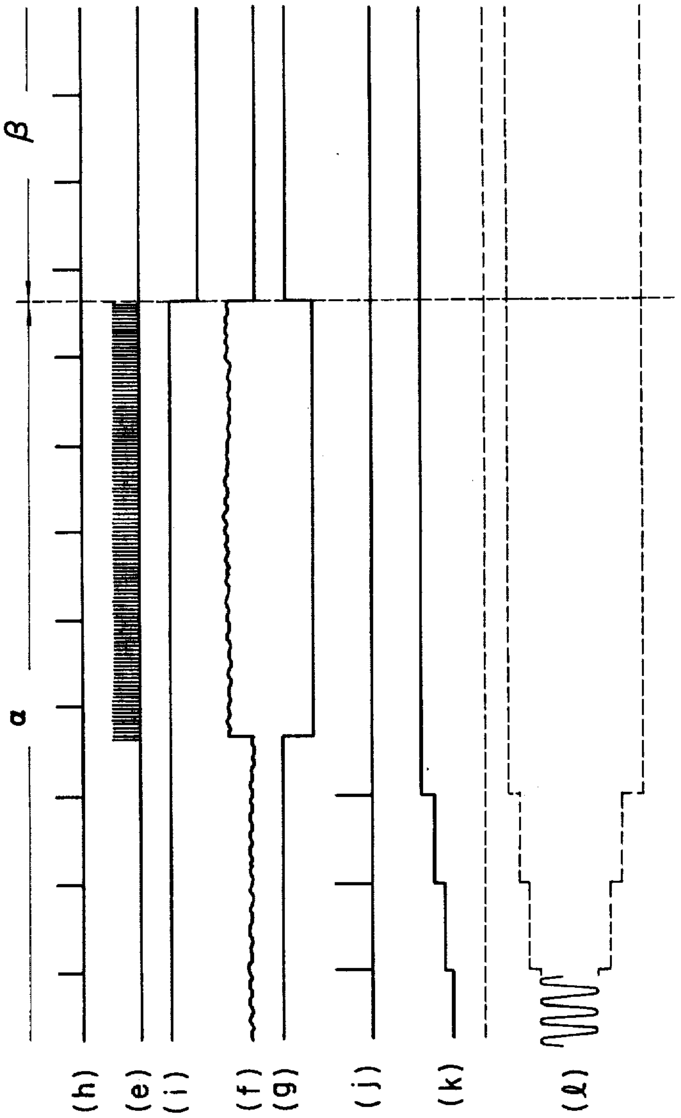

FIG. 7 shows the various signals in a proper phase relation in a time chart diagram. Referring to FIG. 7, the test command signal *i* and the excitation level shifting clock pulse *h* are applied to the AND gate 41 having three inputs during the interval $\alpha$. Since the test-command signal *i* is supplied also to the switching circuit 31, the latter allows the test information signal *d* (FIG. 6 (*d*)) to pass therethrough and be applied to the charging electrode 8. When the proper phase relation such as shown in FIG. 6, (A) prevails, the satellite ink droplets 6 will be imparted with proper charge. The satellite ink droplets 6 will then impinge onto the detector 19, whereby the output signal represented by *e* can be obtained from the bandpass filter 21. This output signal is subsequently rectified and smoothed by the rectifier circuit 22 and results in the voltage represented by *f*. The waveform shaping circuit 23 can thus produce the digital signal 1 at the output thereof, which signal is then inverted by the inverter 40 into 0 which constitutes the input signal *g*1 for the AND GATE 41. Consequently, no output *j* can be obtained from the AND gate 41. Under these conditions, the output from the multiplier circuit 30 remains as the vibrating voltage of a constant amplitude. When the test command signal *i* disappears at the termination of the test interval, one of the inputs to the AND gate 41 is cleared, so that no output *j* will be produced from the gate 41 regardless of the two other inputs. At this time, the switching circuit 31 allows the recording pattern information signal *c* to pass therethrough, whereby the satellite ink droplets 6 are imparted with a quantity of charge comforming to the desired deflection.

In this manner, in the ink jet recording apparatus according to the invention, the testing (or checking) process and the recording process are alternately repeated to thereby form a series of recording patterns.

Next, description will be made on the phase correcting operation for correcting the improper phase relation with reference to FIG. 8. When the test command signal *i* is input, the switching circuit 31 permits the test information signal *d* to pass therethrough, whereby the satellite ink droplets 6 will be charged owing to the information signal *d*. However, as can be seen from the phase relation B or C illustrated in FIG. 6, the satellite ink droplets 6 will not be charged, if the phase of the satellite ink production is deviated from the phase of the test information signal. The ink droplets which have not been charged will run straight without being deflected by the deflection electrodes 9*a* and 9*b*, and thus cause no impingement onto the detector 19. Accordingly, neither output *e* from the band pass filter 21 nor the rectified output *f* can be obtained. Consequently, the output from the waveform shaping circuit 23 is "0", resulting in the output from the inverter 40 being "1". On the other hand, since the excitation level shifting clock pulses *h* are generated at a constant interval, the AND gate 41 having three inputs is enabled by the clock pulse *h* to supply the output *j* to the counter 26 in synchronization with the clock pulse *h*. The contents of the counter 26 are incremented, thereby to increase the output of the D-A converter 27. The output *k* from the adder circuit 29 and hence the output voltage *l* from the multiplier 30 are increased, whereby the timing phase of the satellite ink droplet separation or production is corrected in accordance with the characteristic shown in FIG. 4D. The counter 26 counts up the signal *j* for every clock pulse *h* and increases the excitation voltage *l* until the timing phase *b* of the satellite ink droplet production becomes in a proper relation with the phase of the test information signal voltage *d*. When the phases have been matched in this manner, the satellite ink droplets will then impinge onto the detector 19 and the AND gate 41 is disenabled for the reason described hereinbefore, which results in the disappearance of the output *j* and the stabilization of the excitation output voltage *e*. As a consequence, the proper recording can be effected in the range $\beta$ in a normal manner described above in connection with FIG. 7.

In the foregoing description, it has been assumed that the test or check interval is inserted in the reset interval of the scanning head. However, it will be appreciated that the check or test interval may be implemented during any other periods such as the span between the recording information patterns, so far as the test interval does not interfere with the information recording.

Further, in the embodiments described above, the teaching of the invention has been applied to the phase matching for the satellite ink droplets. However, it will be understood that the invention can be equally implemented on the recording apparatus in which ink droplets of large size are used, because the relation between the excitation voltage $V_e$ and the timing phase of the ink droplet separation is equally applicable for the large size ink droplets.

I claim:

1. In a recording apparatus of the ink jet type including a high frequency voltage source, nozzle means supplied with ink under pressure for generating an ink stream along a predetermined path, and electromechanical converter means for vibrating said nozzle means to cause said ink stream to break up into a stream of regularly spaced ink droplets, a system for control of said ink droplets comprising:

first circuit means for applying to said electromechanical converter a voltage for vibrating said nozzle means in synchronism with the output voltage of said high frequency voltage source so as to cause said ink stream to break up into ink droplets of larger and smaller size;

a charging electrode disposed along said predetermined path at the point of separation of said droplets from said ink stream for inducing an electrical charge in said droplets;

deflection means disposed along said predetermined path downstream of said charging electrode for providing a constant electrostatic field across said predetermined path to cause deflection of said droplets to a degree depending on the electrical charge induced therein;

second circuit means for generating a recording information signal voltage of square waveform whose center is in synchronism with a predetermined phase of the output voltage of said high frequency voltage source and whose amplitude is equivalent to the charge required to impart a desired amount of deflection to a droplet in said deflection electrostatic field;

third circuit means for generating a test information signal voltage having a narrower square waveform than said recording information signal voltage and being in synchronism with the output voltage of said high frequency voltage source so as to impart a predetermined charge to said ink droplets and occur only in synchronism with the generation of said droplets of smaller size;

switching means for selectively connecting the outputs of said second and third circuit means to said charging electrodes at different time periods;

catcher means disposed along said predetermined path downstream of said deflection means to intercept ink droplets which have no induced electrical charge;

detector means for detecting said ink droplets of smaller size properly charged by the voltage of said test information signal voltage;

decision circuit means responsive to the output of said detector means for determining whether said ink droplets of smaller size are properly produced and charged by the voltage of said test information signal; and correction circuit means responsive to the output of said decision circuit means for controlling the magnitude of the output voltage of said first circuit means to adjust the point of droplet separation from said ink stream.

2. A recording apparatus of an ink jet type as set forth in claim 1 wherein the center of the waveforms of both said recording information signal voltage and said test information signal voltage are in phase with the output voltage of said high frequency voltage source.

3. A recording apparatus of an ink jet type as set forth in claim 1 wherein said decision circuit comprises a band-pass filter connected to said detector means and a rectifying circuit, a smoothing circuit and a waveform shaping circuit which are connected in series to the output of said band-pass filter.

4. A recording apparatus of an ink jet type as set forth in claim 3 wherein said band-pass filter has a band-pass characteristic capable of passing said test information signal only.

5. A recording apparatus of an ink jet type as set forth in claim 1 wherein said correction circuit comprises:

a multiplier circuit connected between said high-frequency voltage source and said electro-mechanical converter;

pulse generator means for generating a periodic pulse signal when the output signal of said decision circuit indicates that said ink droplets are not properly produced and charged;

counter means for counting output pulses received from said pulse generating means; and a D-A converter circuit connected between said counter means and said multiplier circuit.

6. A recording apparatus of an ink jet type as set forth in claim 5 wherein said correction circuit further comprises:

a DC power source; and an adder receiving output signal voltages from said DC power source and said D-A converter circuit for applying an output signal thereof to said multiplier circuit.

7. A recording apparatus of an ink jet type as set forth in claim 6 wherein said decision circuit comprises a band-pass filter connected to said detector means and a rectifying circuit, a smoothing circuit and a waveform shaping circuit which are connected in series to the output of said band-pass filter.

8. A recording apparatus of an ink jet type as set forth in claim 7 wherein said pulse generator means comprises:

an AND circuit with three inputs;

an inverter connected between a first input terminal of said AND circuit and an output terminal of said waveform shaping circuit;

a clock pulse generator connected to a second input terminal of said AND circuit; and test command signal generating means connected with a third input terminal of said AND circuit.

* * * * *